United States Patent
Gaylord et al.

[11] Patent Number: 6,125,160
[45] Date of Patent: Sep. 26, 2000

[54] NUCLEAR FUEL BUNDLE SPACER ENVELOPE DIMENSION MEASURING SYSTEM AND METHODS

[75] Inventors: William B. Gaylord; Charles F. Laing; William C. Peters; David O. Sheppard, all of Wilmington; David G. Smith, Leeland; Edward G. Apple, Jr., Wilmington, all of N.C.

[73] Assignee: General Electric Company, Schenectady, N.Y.

[21] Appl. No.: 09/359,665

[22] Filed: Jul. 26, 1999

[51] Int. Cl.[7] ............................... G21C 19/00; A45B 3/08
[52] U.S. Cl. ..................... 376/261; 376/245; 376/258; 33/701
[58] Field of Search .................................. 376/245, 258, 376/261; 33/701, 710, 712

[56] References Cited

U.S. PATENT DOCUMENTS

| | | | |
|---|---|---|---|
| 4,777,011 | 10/1988 | Scharpenberg | 376/245 |
| 4,865,800 | 9/1989 | Amhed et al. | 376/248 |
| 5,112,566 | 5/1992 | Butzin et al. | 376/245 |
| 5,917,875 | 6/1999 | Tuzio et al. | 376/245 |

*Primary Examiner*—Charles T. Jordan
*Assistant Examiner*—K. Kevin Mun
*Attorney, Agent, or Firm*—Nixon & Vanderhye

[57] ABSTRACT

The spacer envelope measurement system includes a generally U-shaped fixture having support plates extensible into positions overlying the spacer for supporting the fixture from the spacer. Extensible heads are carried by the fixture for engaging the spacer, followed by the heads of measurement gauges whereby, upon extending the heads into clamping engagement with the spacer along opposite sides thereof, the measurement gauges accurately determine the lateral dimensions of the irradiated spacer. A spacer bar clamp member is pivotal between positions opening the fixture opposite the base leg of the U-shaped fixture, enabling the bundle to reside within the U-shaped opening and a second position closing the opening for aligning the fixture and the bundle. The measurements are taken under water in a nuclear fuel service pool.

10 Claims, 6 Drawing Sheets

NUCLEAR FUEL BUNDLE SPACER ENVELOPE DIMENSION MEASURING SYSTEM AND METHODS

BACKGROUND OF THE INVENTION

The present invention relates to apparatus and methods for measuring the lateral dimensions of irradiated spacers of a nuclear fuel assembly and particularly relates to apparatus and methods for measuring the lateral dimensional envelope of irradiated spacers in fuel bundles while located within a nuclear reactor servicing pool to determine the extent of growth or out-of-squareness of the irradiated spacer.

Spacers are employed at axially spaced locations in fuel bundles to maintain the fuel rods separated from one another at well-defined lateral distances and permit flow of moderator/coolant from the lower tie plate of the nuclear fuel assembly upwardly through the assembly to generate steam ultimately used to produce electrical power. The fuel bundle comprising the spacers and fuel rods are encased within a generally rectangular fuel bundle channel and a plurality of such nuclear fuel assemblies makes up the core of a nuclear reactor. During operation in the nuclear reactor, the spacers in the nuclear fuel assemblies are subjected to radiation and thermomechanical stresses that can cause the overall dimensions of the spacers' envelopes to change, e.g., to increase. The term envelope as used herein means the lateral dimensions of the spacer, i.e., the X-Y dimensions, where the Z axis of the Cartesian coordinate system is in the direction of the fuel rods from the lower to the upper ends of the fuel bundle. If the envelope dimensions for a given spacer in a bundle increase to a significant extent, the ability to remove the fuel bundle from the channel and to reinsert the fuel bundle into a channel during servicing of the fuel assembly is seriously compromised. Accordingly, there is a need for a system for measuring the spacer envelope dimensions for each spacer in an irradiated or unirradiated assembled fuel bundle without requiring disassembly of the bundle and to enable the measurements to take place in situ in the nuclear reactor servicing pool.

BRIEF SUMMARY OF THE INVENTION

According to a preferred embodiment of the present invention, apparatus and methods are provided to enable measurement of the lateral envelope dimensions of fuel bundle spacers while a dechanneled bundle is in the fuel bundle inspection or fuel prep station in the nuclear reactor servicing pool whereby measurements of the spacer envelopes enable prediction of when or if the spacer dimensions exceed the internal tolerances of the fuel bundle channel. To accomplish this and in a preferred embodiment of the present invention, there is provided a fixture for submersion in the service pool. The fixture has reference points which are located relative to "bathtubs" on the external sides of the spacers. The "bathtubs" comprise lateral outward projections formed on the sides of the spacer band forming the peripheral margin of the spacer and which bear along an inside surface of the fuel bundle channel. The fixture is generally U-shaped and has fuel bundle engaging supports, e.g., fingers movable between extended positions overlying the marginal band of the spacer and a retracted position laterally outwardly of the spacer. The fingers, when the fixture is positioned about the spacer in the pool, are extended such that the fixture is wholly supported by the spacer from the fuel bundle.

To ensure the relative positioning of the fixture and fuel bundle, the fixture carries a member movable between a position enabling the U-shaped fixture to receive the spacer within the fixture and a second position adjusting and clamping the fixture and spacer relative to one another. More particularly, with the spacer in the fixture and the fixture supported by the fingers engaging the marginal band of the spacer, the member in a preferred embodiment is pivoted from a first position to a second position and applies a force against the side of the spacer opposite the base of the U-shaped fixture to locate the fixture and spacer relative to one another and to ensure proper alignment. Once the fixture and the particular spacer undergoing measurement are located relative to one another, the fixture and bundle are releasably secured to one another by clamps carried by the fixture. The clamps include clamping heads or members which are extendible from opposite legs of the channel-shaped fixture to engage the bathtubs on opposite sides of the spacer. Measuring gauges follow the movement of the clamping members. Consequently, the movement of the gauges from predetermined reference points is used to determine the lateral dimension.

Once a measurement is taken, e.g., in the X-direction of the spacer, the fixture and bundle can be relatively moved such that sides of the spacer 90° relative to the measured sides of the spacer can be disposed in the fixture to enable lateral measurement of the spacer dimensions in the Y-direction of the spacer.

Once the dimensions of a particular spacer are ascertained, the fixture and fuel bundle are relatively moved to enable lateral envelope measurements of additional spacers of the fuel bundle. Preferably, the fuel bundle is elevated or lowered by the fuel preparation machine such that the fixture and another spacer of the bundle can be positioned relative to one another to afford measurements of the envelope of the additional spacer.

It will be appreciated from the foregoing discussion that the spacer envelope measurements are made without requiring disassembly of the bundle and that the measuring apparatus is handled and positioned remotely while under water in the fuel storage pool. Also, the measuring apparatus accurately positions the fixture relative to the fuel bundle spacer to enable highly accurate measurements of the lateral spacer dimensions. For example, the desired accuracy of the spacer envelope dimensional measurement is ±0.0005 inches.

In a preferred embodiment according to the present invention, there is provided a method of measuring a lateral dimension of an irradiated spacer forming part of an irradiated fuel bundle, comprising the steps of (a) engaging a fixture along opposite sides of the fuel bundle, (b) positioning at least one measuring element carried by the fixture along one side of the spacer and (c) determining the lateral dimension of the spacer between one side and an opposite side thereof using the measuring element.

In a further preferred embodiment according to the present invention, there is provided apparatus for measuring a lateral dimension of an irradiated spacer of a nuclear fuel bundle, comprising a generally U-shaped fixture for receiving the fuel bundle within opposite legs of the fixture, a measuring element carried by one of the legs in lateral opposition to another of the legs, a reference adjacent another leg wherein the element and reference are used to measure a lateral dimension of the spacer and a member carried by the fixture for movement between a first position enabling the fuel bundle for reception within the U-shaped fixture and a second position at least in part in an opening opposite a base of the U-shaped fixture to clamp the fuel bundle within the fixture.

In a still further preferred embodiment according to the present invention, there is provided apparatus for measuring a lateral dimension of an irradiated spacer of a nuclear fuel bundle, comprising a generally U-shaped fixture for receiving the fuel bundle within opposite legs of the fixture, a measuring element carried by one of the legs in lateral opposition to another of the legs, a reference adjacent another leg wherein the element and reference are used to measure a lateral dimension of the spacer and at least one fixture support movable between a first position retracted from the spacer and a second position engaging the spacer for supporting the fixture from the spacer.

In a still further preferred embodiment according to the present invention, there is provided apparatus for determining the out-of-squareness of an irradiated spacer of a nuclear fuel bundle, comprising a generally U-shaped fixture for receiving the spacer of the fuel bundle within opposite legs of the fixture and a pair of movable measuring elements carried by the fixture and respective datums therefor, the elements being movable relative to the datums upon receipt of the spacer within the fixture affording an indication of the out-of-squareness of the spacer.

In a still further preferred embodiment according to the present invention, there is provided a method of determining any out-of-squareness of an irradiated spacer forming part of an irradiated fuel bundle, comprising the steps of (a) engaging a fixture along opposite sides of the fuel bundle, (b) engaging a third side of the spacer along a reference carried by the fixture, (c) positioning a pair of spaced measuring heads carried by the fixture along one side of the spacer and (d) determining the extent of out-of-squareness of the spacer with reference to any displacement of the measuring heads from predetermined datums.

DETAILED DESCRIPTION OF THE INVENTION

Figure 1:
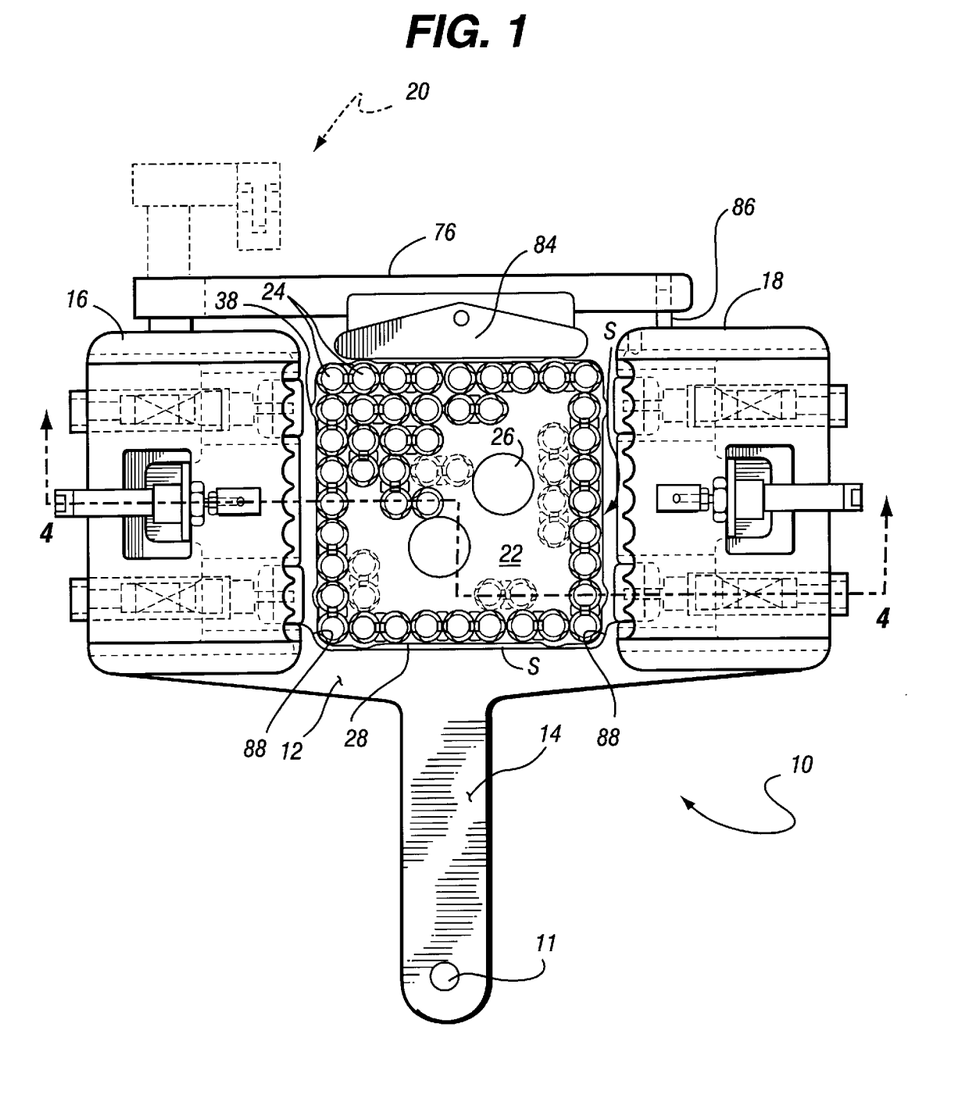
FIG. 1 is a plan view of a spacer envelope dimension measuring system illustrating a measuring fixture about the spacer of a fuel bundle.
Figure 2:
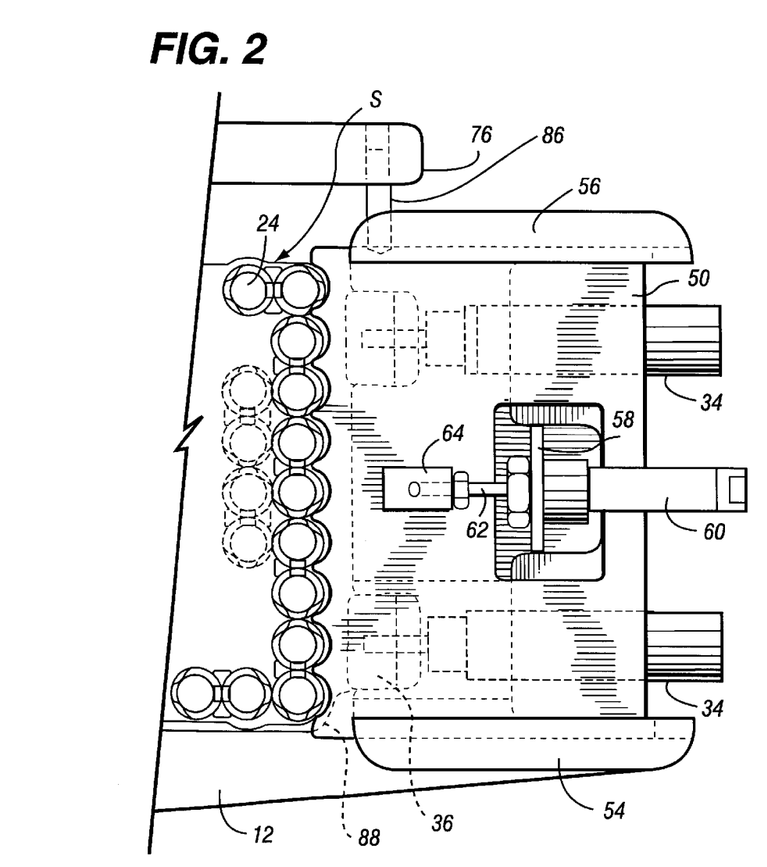
FIG. 2 is a partial plan view thereof with locating fingers in engagement along upper margins of the peripheral band of the spacer for supporting the fixture from the spacer.
Figure 3:
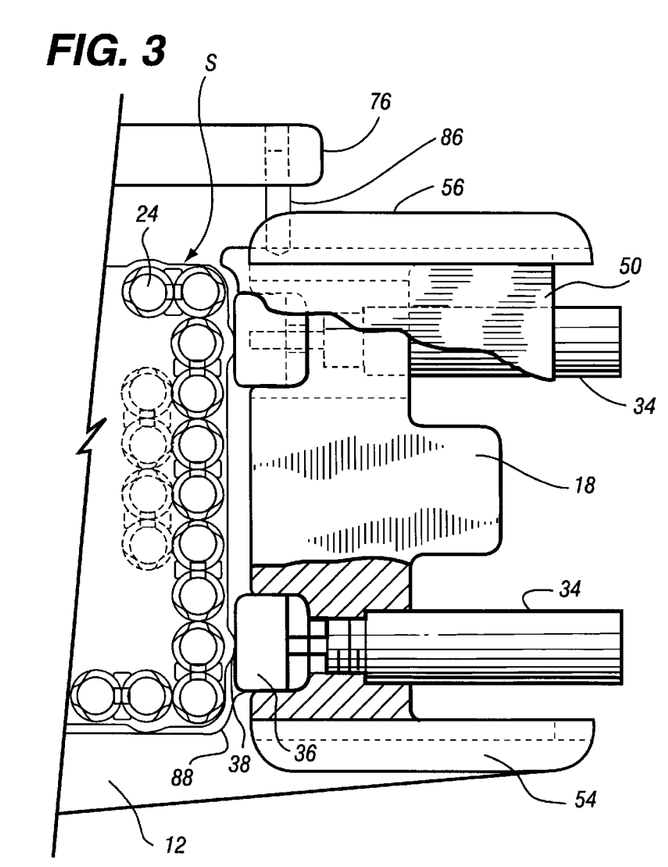
FIG. 3 is a view similar to FIG. 2 with parts broken out and in cross-section illustrating the engagement of the measuring heads against the spacer bathtubs.

Referring to the drawings and particularly to FIG. 1, there is illustrated a spacer envelope measurement system, generally designated 10, comprised of a fixture 12 preferably having a U-shaped configuration with a base leg 14 and opposite legs 16 and 18. The fixture 12 also carries a clamp assembly 20 movable between a first position illustrated by the dashed lines in FIG. 1 wherein the side of the fixture 12 remote or opposite to the base leg 14 is open and a second position as illustrated wherein the assembly 20 at least in part closes the open side of the U-shaped fixture. Thus, the legs 14, 16 and 18 define a normally open area for receiving the spacers of a nuclear fuel bundle. Also illustrated in FIG. 1 is a nuclear fuel bundle 22 comprised of a matrix of nuclear fuel rods 24 and one or more water rods 26 passing through a plurality of spacers S spaced vertically from one another. The spacers typically comprise ferrules for maintaining the fuel rods and water rods in accurate lateral spaced relation from one another throughout the height of the bundle and are typically bounded by a marginal band 28. In this particular arrangement, a 9×9 array of fuel rods is illustrated.

Figure 5:
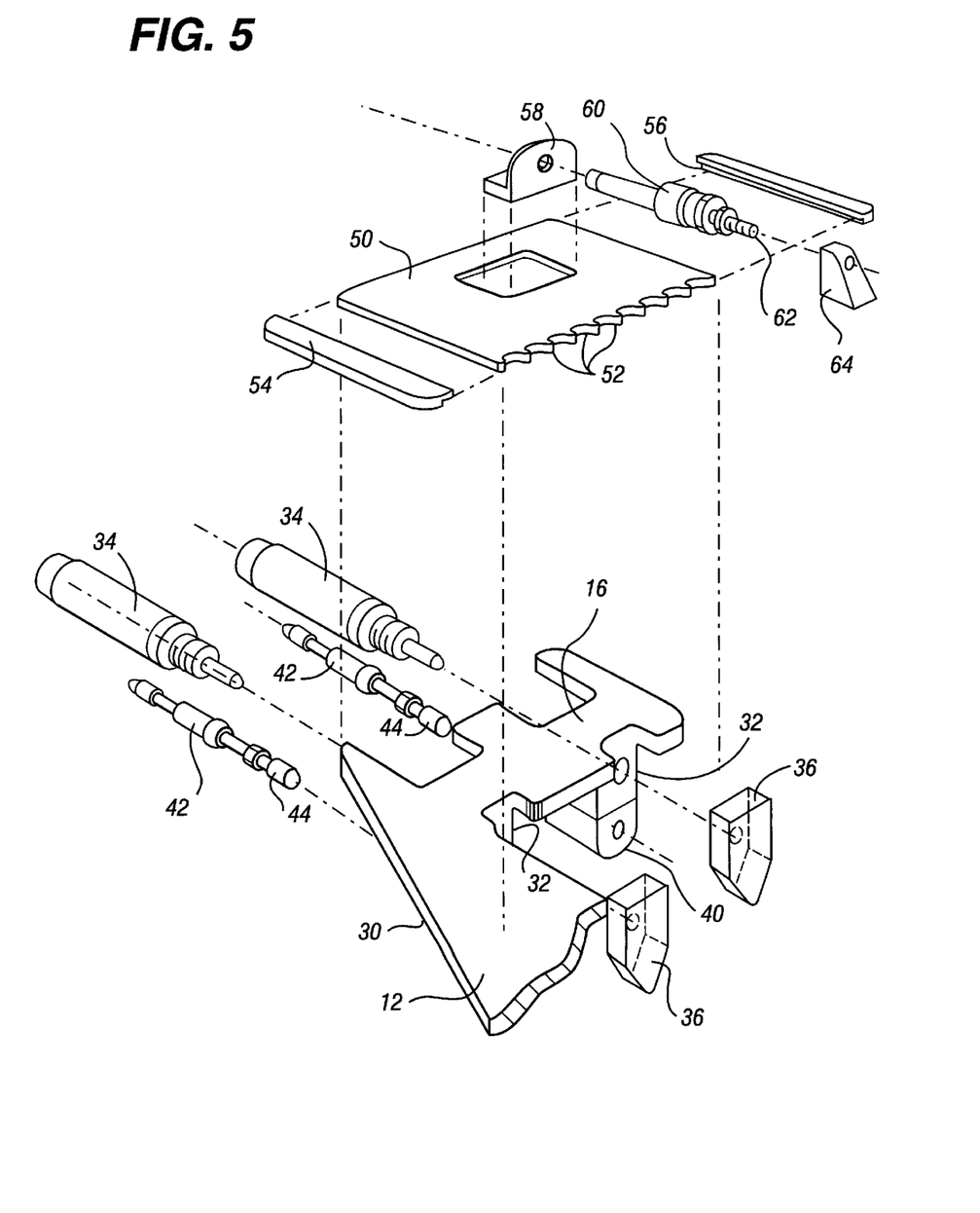
FIG. 5 is an exploded view of one of the sides or legs of the fixture illustrating the measuring heads, gauges and locating fingers.

Referring to FIG. 1, it will be appreciated that the legs 16 and 18 on opposite sides of the fixture 12 are identical to one another and a description of one will suffice as a description of the other. Referring to FIG. 5, the left side leg 16 forms an integral leg of a base frame 30 of the fixture 12. Depending from leg 16 are a pair of spaced mounting bosses 32 for mounting water-dampened, spring returned air actuated clamp cylinders 34. Each of the clamp cylinders 34 carries an extensible and retractable head 36 for engagement with a bathtub 38 (FIG. 1) on the side of the spacer S. The bathtubs 38 are lateral projections adjacent opposite ends of each side of the marginal band about the spacer S. The bathtubs 38 engage along the inside surface of the fuel bundle channel, not shown. Thus, it will be appreciated that the heads 36 can be advanced and retracted to engage the opposite sides of the spacers at the bathtubs 38.

Depending below each boss 32 is another boss 40 for mounting a linear scale springloaded measuring element, e.g., a gauge 42. The heads 44 of the gauges 42 engage along the rear surfaces of the heads 36 carried by the clamp cylinders 34. Thus, as the heads 36 advance and retract, the heads 44 of the measuring gauges 42 follow the movement of the heads 36.

Mounted on top of each of the legs 16 and 18 is a fixture support, e.g., a plate 50 having a plurality of fingers 52 along an inside edge. Preferably the fingers 52 are scallop-shaped and correspond in position to the position of the fuel rods 24 (FIG. 1) in the 9×9 array thereof. Plate 50 is mounted on each leg for sliding movement toward and away from the fuel bundle. Particularly, guide and hold-down bars 54 and 56 are located on the legs 16 and 18 adjacent opposite ends thereof. Bars 54 and 56 include flanges for overlying the margins of plates 50 whereby plates 50 are slidable toward and away from the fuel bundle. To slide each plate 50, there is provided on each leg 16 and 18, an angle bracket 58, a base of which is secured to the corresponding legs 16 or 18. The upstanding flange of bracket 58 mounts a double-acting air cylinder 60. The extensible rod 62 of the air cylinder 60 is connected to a lug 64, in turn secured to the plate 50. It will be appreciated that by actuation of the air cylinder 60, rod 62 may be extended whereby plate 50 is advanced toward the fuel bundle and, upon retraction of the rod 62, the plate 50 is retracted relative to the fuel bundle.

Figure 4:
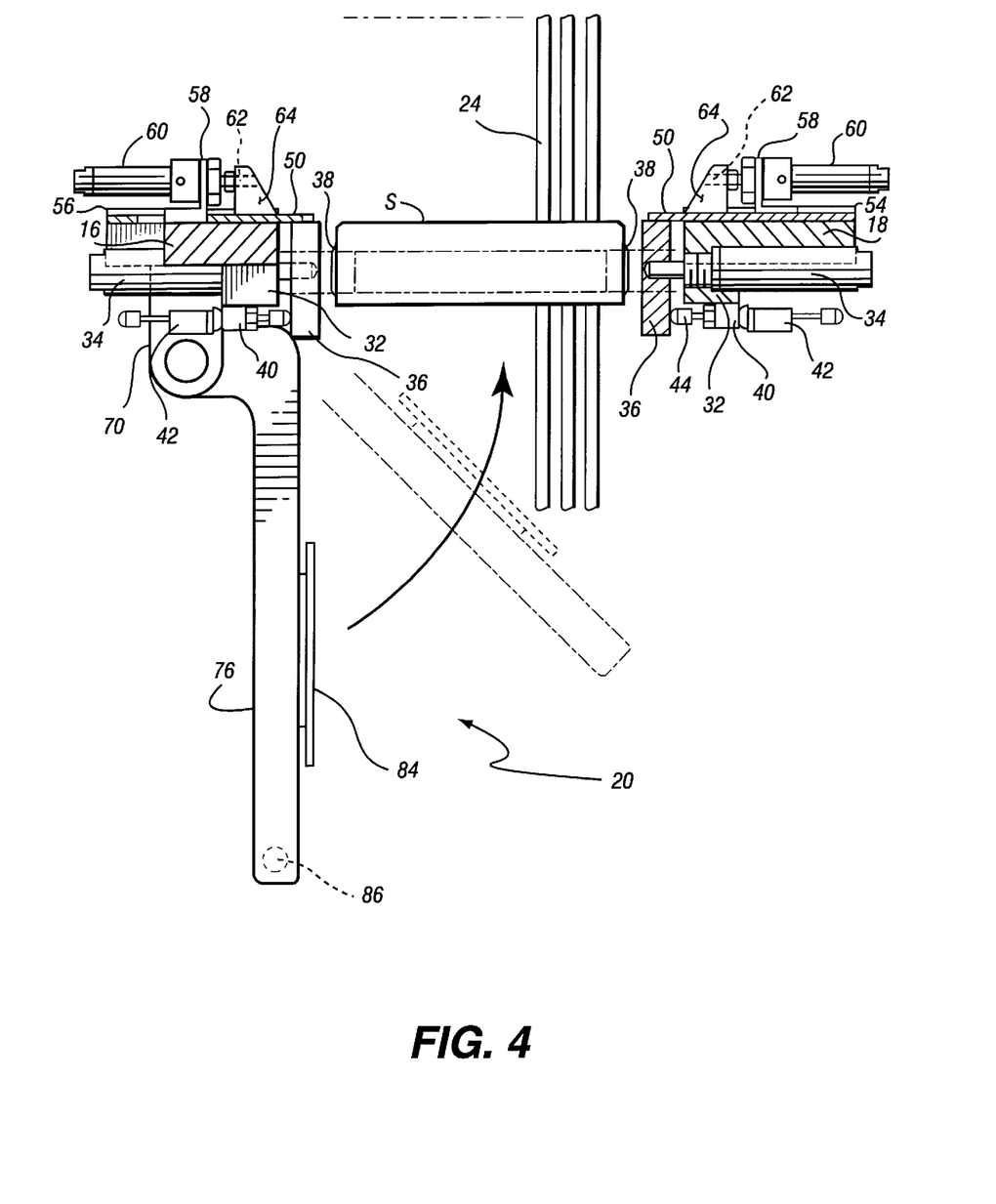
FIG. 4 is a cross-sectional view taken generally about on line 4—4 in FIG. 1.
Figure 6:
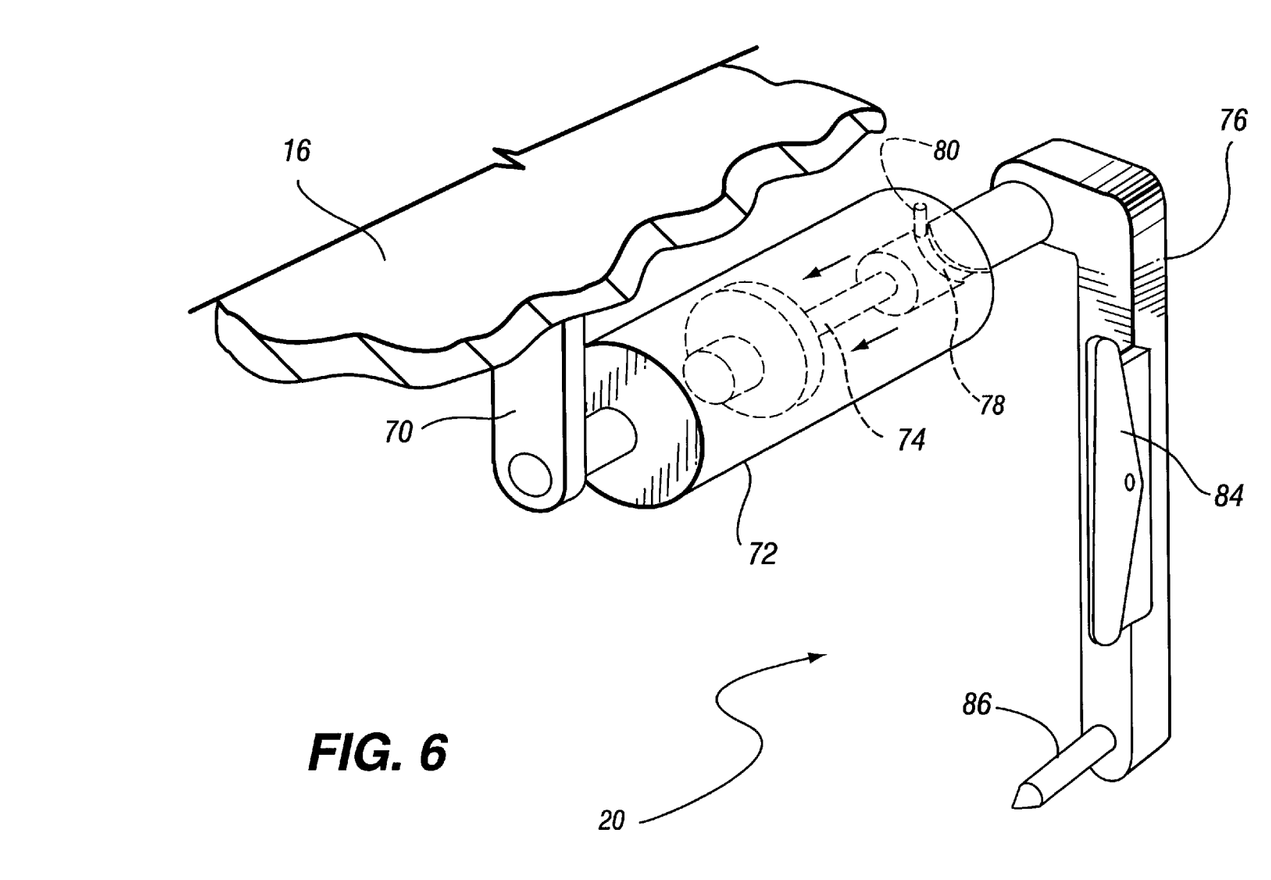
FIG. 6 is a fragmentary perspective view with parts in cross-section illustrating a fixture-adjusting member in a fixture-open position.

Referring particularly to FIGS. 1, 4 and 6, one of the legs 16 and 18, for example, leg 16, includes a depending bracket 70. Bracket 70 mounts an air-actuated cylinder 72 having a piston rod 74 connected to a spacer bar clamp member 76, all forming part of the clamp assembly 20. By extending and retracting the piston 74, the spacer bar clamp member 76 may be moved away from and toward the leg 16. Additionally, the rod 74 includes a groove 78 engaging a fixed pin 80 carried along the interior surface of a cylinder 72 surrounding the piston rod 74. By engaging the pin 80 in the groove 78, retraction of the clamp member 76 toward the leg 16 causes the bar to pivot about the axis of the cylinder 72 into a second position illustrated in full lines in FIG. 1. The clamp member 76 also includes a loose-fitting clamping head 84 for bearing engagement against the bathtubs 38 along the side of the spacer remote from the base leg 14 of fixture 12. A pin 86 is mounted on the end of the clamp bar member 76 and engages in a slot on the opposite leg 18, assisting to guide the clamp bar member 76 into a position at least in part closing the open side of the U-shaped fixture 12. Thus, the member 76, in an axially extended first position as illustrated by the full lines in FIG. 4, permits relative movement of the fuel bundle and fixture enabling location of the fuel bundle within the fixture 12. In an axially retracted second position, the clamp bar member 76 bears against the outside surface of the spacer, maintaining the interior corners of the spacer bearing against nesting radii 88, thus assuring alignment of the bundle within the fixture.

From the foregoing description, it will be appreciated that once the spacer and fixture are relatively located as in FIG. 1, the pairs of measuring gauges adjacent opposite sides of the spacer measure the lateral dimensions of the spacer adjacent the fixture 12 and clamp bar 76, i.e., in an X-direction. Those two measured dimensions can also indicate the degree to which, if any, the spacer band is out-of-square. By rotating the fixture and bundle 90° relative to one another, the lateral dimensions of the spacer in the Y-direction can similarly be ascertained. Whether the spacer is out-of-square in that direction can also be determined.

It will be appreciated that the fixture is first calibrated before any measurements are taken in order to zero out the measuring gauges. To accomplish this, a gauge block is inserted between the legs 16 and 18. Preferably, the gauge block corresponds to the desired exact dimensions of the spacer. Thus, any deviation of the gauges from the calibrated position is indicative of the growth of the spacer. It will also be appreciated that the bundle need not be exactly centered between the opposite legs 16 and 18 in order to effect an accurate measurement of the lateral dimension of the spacer. That is, once the gauges are calibrated, the difference in the extension and/or retraction of the left and right-hand gauges is indicative of the desired length measurement. It is also noted that the gauge heads 44 follow the movement of the clamp heads 36 and therefore it is only the change in lateral dimension from the measured gauge block which is measured. The measurements, of course, are recorded remotely. It will also be appreciated that a single measuring gauge can be utilized with the head 36 or other abutment opposite the single measuring gauge serving as a reference datum for the measurement. Preferably, however, oppositely directed pairs of measuring gauges are used, particularly where out-of-square measurements are desired.

Figure 7:
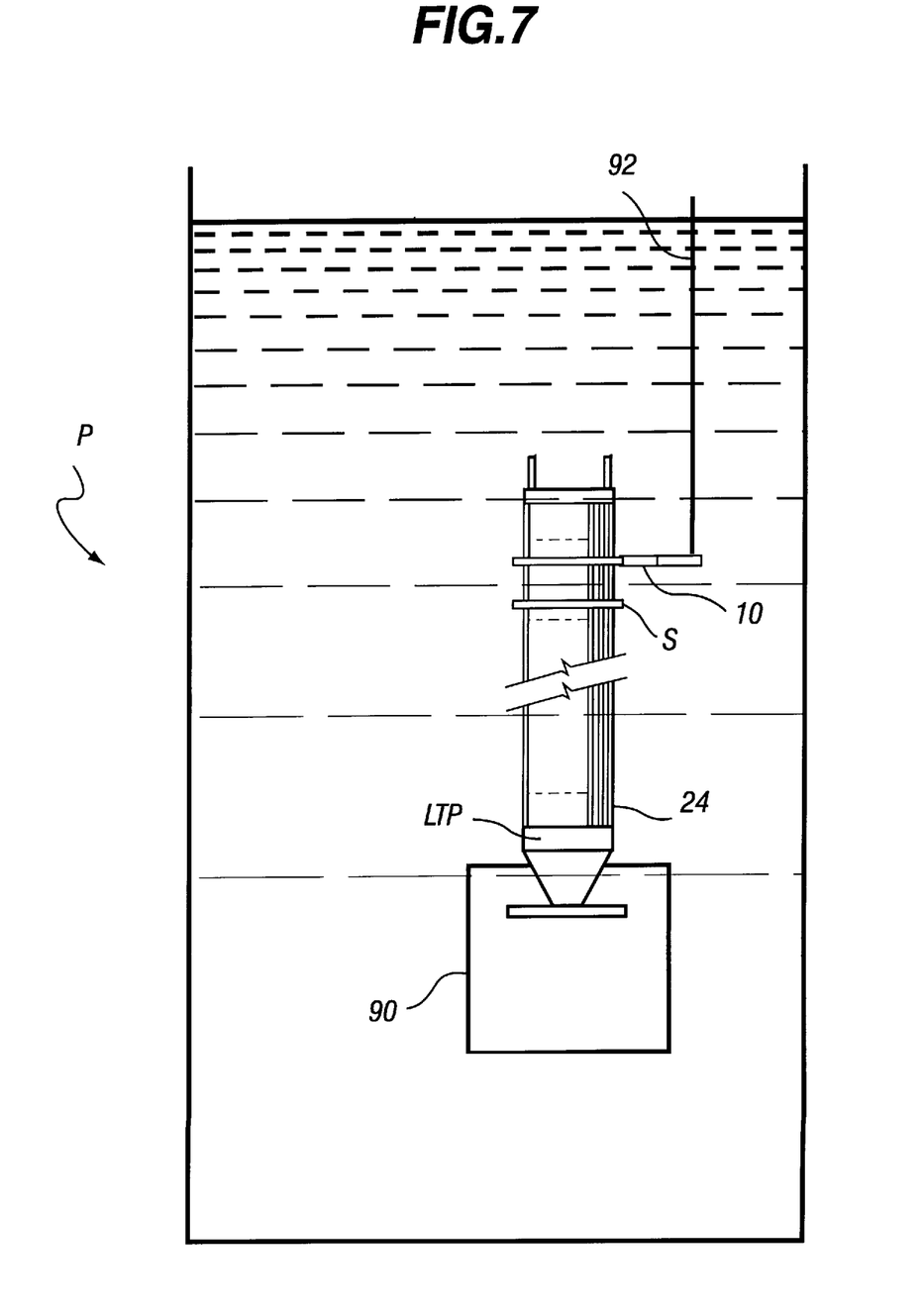
FIG. 7 is a schematic illustration of the fuel bundle supported on a fuel prep machine within a nuclear fuel service pool.

To employ the spacer envelope dimension measurement system of the present invention, it will be appreciated that the fuel assembly is removed from the nuclear core and transported to a fuel assembly service pool, generally indicated P in FIG. 7. The bundle is de-channeled, i.e., the channel is removed from about the bundle, leaving the bundle, including the fuel rods 24, spacers S and lower tie plate LTP intact. The bundle is also disposed in a fuel prep machine 90 which supports the bundle. The fuel bundle is now in position to employ the measuring system hereof. With the clamp assembly 20 in a first position out of registration with the opening between legs 16 and 18 and after calibration, the fixture 12 is lowered on a support tool, for example, a pole 92, which releasably connects with the base leg of the fixture mounting 11. By manipulating one or the other, or both, of the fixture and the fuel bundle, the fuel bundle can be disposed between the opposite legs 16 and 18 of the fixture 12 and at an elevation corresponding to the elevation of the spacer selected for measurement. In FIG. 7, the uppermost spacer is being measured. With the fixture located adjacent the spacer S, the air-actuated cylinders 60 carried by the legs 16 and 18 are actuated to extend the plates 50 to locate the fingers 52 above the upper margin of the peripheral band of the spacer S. The plates 50 are extended such that the scalloped edges 52 overlie the peripheral band of the spacer along its opposite sides. The edges 52, however, need not and preferably do not engage the fuel rods 24. With the plates 50 extended, the fixture is lowered relative to the bundle such that the fixture is entirely supported by the spacer without support by the pole 92. When supported, pole 92 is removed. The air-actuated cylinder 72 is then actuated to retract the spacer bar clamp member 76 toward the outside margin of the spacer. The retraction of the clamp member 76 also causes the member 76 to pivot into a position, bringing the clamp head 84 against the outer bathtubs of the exposed side of the spacer. By engaging clamp head 84 against the outer bathtubs 38 of the spacer, the fixture 10 is drawn into alignment with the spacer with the inside corners of the spacer engaging against the nesting radii 88.

Air cylinders 34 are then actuated to engage the clamp heads 36 against the bathtubs 38 along opposite sides of the spacer. The heads 44 of the measuring gauges follow the movement of the clamp heads 36, the measuring elements 42, particularly heads 44 serving as references for one another. When the clamp heads 36 are engaged against the spacer, the measurements can be taken and compared with baseline dimensions of the spacer to determine the extent, if any, of growth of the spacer as a result of irradiation. Additionally, by comparing the measurements of the opposed measuring gauges adjacent the leg 12 and the spacer bar clamp member 76, the degree to which, if any, the spacer is out-of-square can also be ascertained.

Once the measurements in one direction, for example, the X-direction, have been taken, measurements in the Y-direction can be taken. To accomplish this, the air cylinders 34 are retracted, disengaging the clamp heads 36 from the spacer. The pole 92 is engaged with the fixture and the air cylinders 60 retract the fixture support plates 50 whereby fixture 10 is supported by the pole 92. Additionally, the cylinder 72 is extended to axially displace the bar clamp member 76 away from the spacer and pivot the bar clamp into an out-of-the-way position, for example, as illustrated in FIG. 4. The fuel bundle and fixture are then moved relative to one another to locate the fuel bundle outside of the fixture. Preferably, the fuel prep machine then rotates the fuel bundle 90° such that the Y dimension of the spacer can be measured, similarly as described above with respect to the X dimension. Upon completion of the measurement in the Y-direction, measurements of one or more additional spacers of the bundle can be taken by relatively displacing the fuel bundle and fixture in a vertical direction to align the next spacer to be measured in the fixture.

To measure for out-of-squareness, the movement of the measuring heads 44 from their datums, e.g., zeroed-out positions, can be used to determine out-of-squareness of the spacer. For example, and with reference to FIG. 1 illustrating an inner side of the spacer aligned against the base leg 14 of the fixture, the movement of the heads 44 adjacent base leg 14 from the zeroed-out positions will be to the left or right, i.e., the heads will be displaced relative to their respective datums.

The measuring heads 44 adjacent the distal ends of the legs 16 and 18 will likewise move from their respective zeroed-out positions. The extent of the movement of the opposed pairs of heads as measured from their respective datums provides a measure of the out-of-squareness of the spacer in one direction, e.g., an X-direction. Out-of-squareness in the opposite Y-direction can similarly be measured upon relative movement of the fuel bundle and fixture to locate the spacer in the fixture 90° relative to the first measurement in the X-direction. Thus, the combined X and Y measurements give a true value to the degree to which the spacer is out-of-square.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of measuring a lateral dimension of an irradiated spacer forming part of an irradiated fuel bundle, comprising the steps of:

(a) engaging a fixture along opposite sides of the fuel bundle;

(b) positioning at least one measuring element carried by said fixture along one side of said spacer; and (c) determining the lateral dimension of the spacer between said one side and an opposite side thereof using said measuring element.

2. A method according to claim 1 including performing steps (a) and (b) under water in a nuclear reactor servicing pool.

3. A method according to claim 1 including positioning a pair of heads carried by the fixture along each side of said spacer in engagement with lateral projections along opposite sides of the spacer to locate the fixture and the spacer relative to one another.

4. A method according to claim 1 including performing steps (a) and (b) under water in a nuclear reactor servicing pool, extending fixture supports from opposite sides of said fixture into engagement with opposite sides of the fuel bundle above the spacer to be measured and extending the fixture supports to overlie margins of the spacer such that the fixture supports support the fixture from the spacer with the fixture supports engaging the spacer margins.

5. A method according to claim 1 wherein step (b) includes supporting said fixture on said fuel bundle.

6. A method according to claim 5 including extending a fixture support from said fixture into engagement with said fuel bundle to support said fixture therefrom and disengaging said fixture from the fuel bundle by retracting said fixture support from engagement with said bundle.

7. A method according to claim 6 wherein step (b) includes locating a pair of fixture supports above the spacer to be measured and extending the fixture supports to overlie opposite side margins of the spacer such that the fixture support supports the fixture from the spacer with the fixture supports engaging the spacer margins.

8. A method according to claim 1 wherein said fixture has a general U-shaped configuration for receiving the fuel bundle laterally through an open side thereof and including engaging the fuel bundle on a side thereof in registration with the open side of said fixture to position the fixture and bundle relative to one another.

9. A method according to claim 8 including displacing a member between a first position retracted from registration with said open side of said U-shaped fixture enabling relative movement of the bundle and fixture to locate the bundle within the fixture and a second position at least in part closing said open side of said U-shaped fixture to retain the fuel bundle within the fixture.

10. A method according to claim 8 including pivoting a clamp member between a first position enabling the open side of said U-shaped fixture to receive a fuel bundle and a second position substantially closing said open side of said fixture to retain the fuel bundle within the fixture.

* * * * *